Dec. 11, 1934.   A. H. REIBER ET AL   1,984,317
KEYBOARD PERFORATOR AND COUNTER
Filed March 25, 1932   5 Sheets-Sheet 1

INVENTORS
ALBERT H. REIBER
BY MAURUS T. GOETZ
ATTORNEY

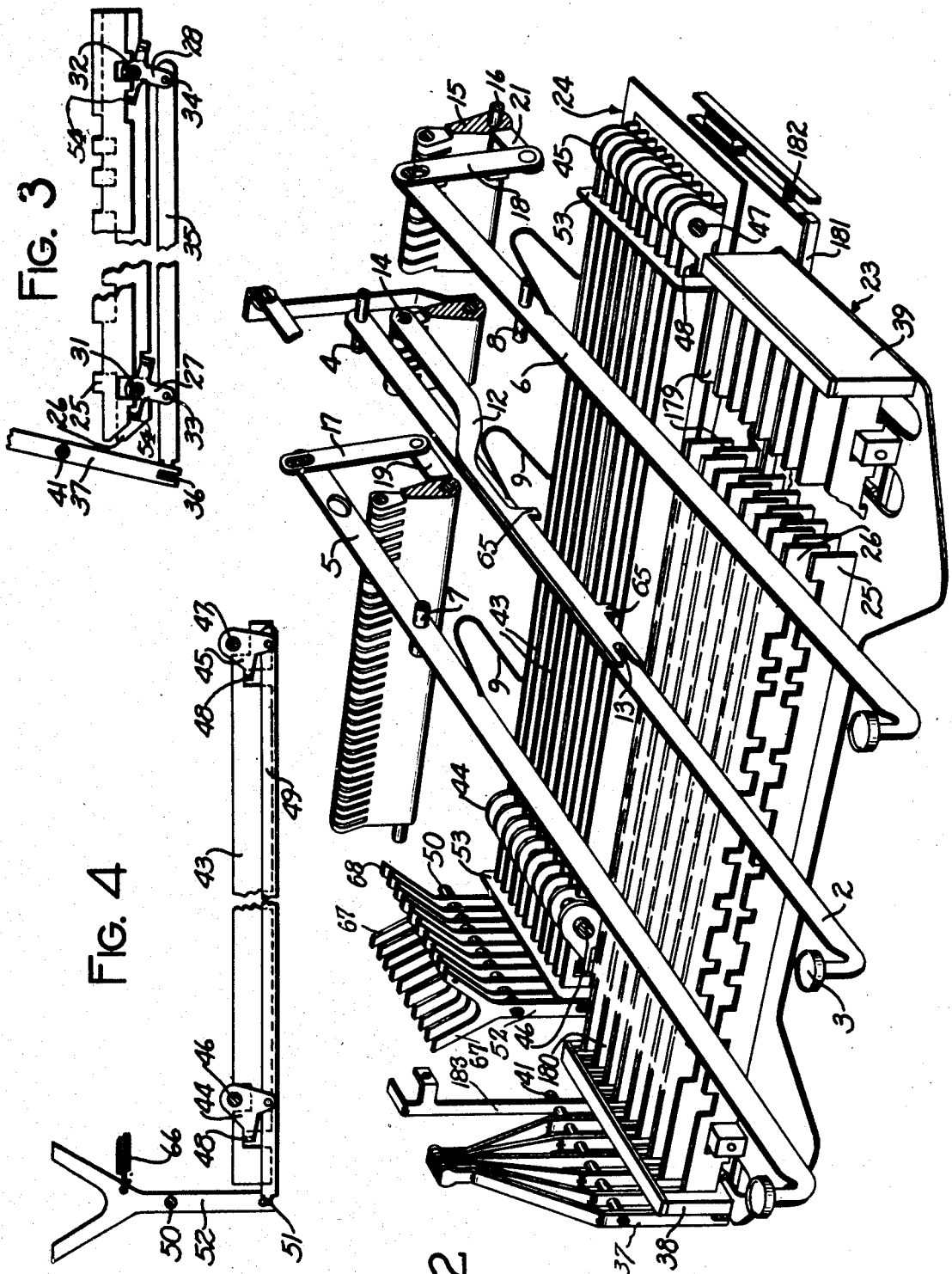

Dec. 11, 1934.  A. H. REIBER ET AL  1,984,317

KEYBOARD PERFORATOR AND COUNTER

Filed March 25, 1932   5 Sheets-Sheet 3

INVENTORS
ALBERT H. REIBER
MAURUS T. GOETZ
BY
ATTORNEY

Dec. 11, 1934.   A. H. REIBER ET AL   1,984,317
KEYBOARD PERFORATOR AND COUNTER
Filed March 25, 1932    5 Sheets-Sheet 4
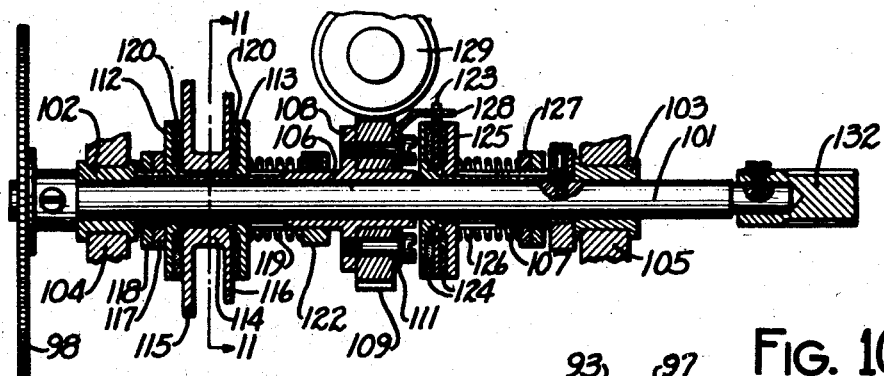
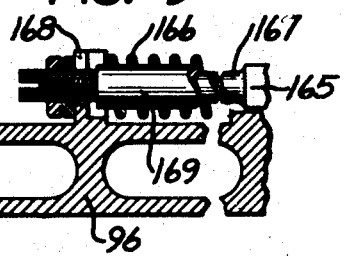
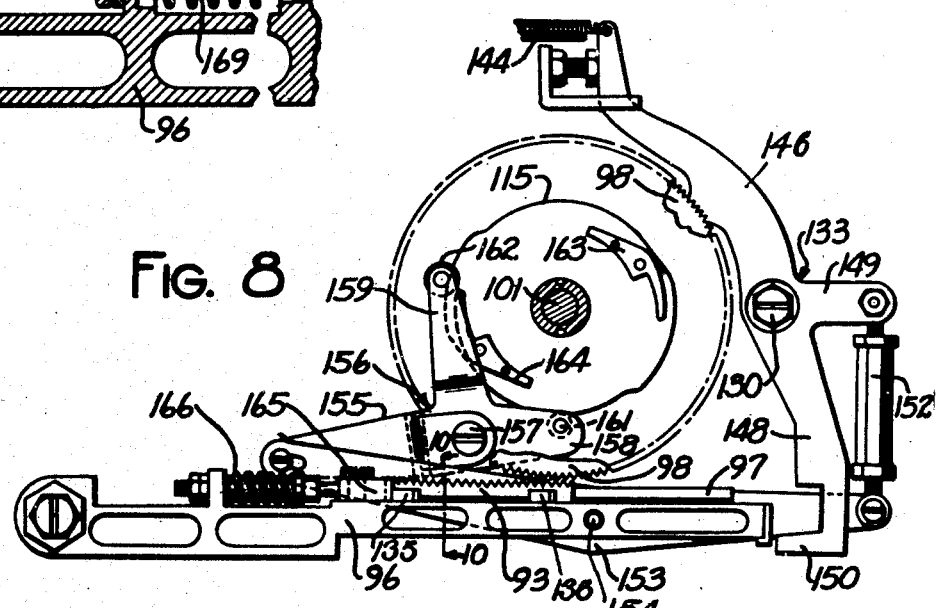
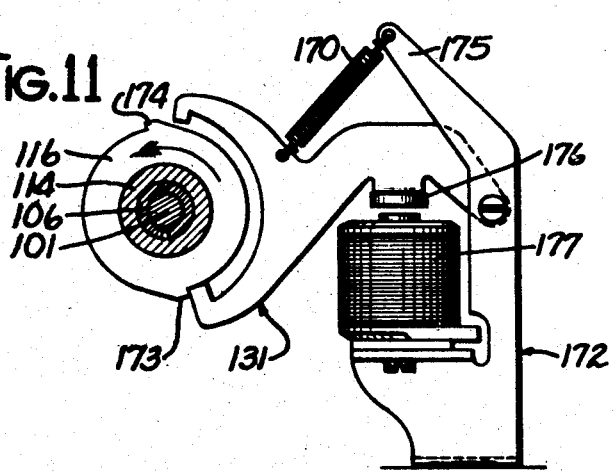
INVENTORS
ALBERT H. REIBER
BY MAURUS T. GOETZ
ATTORNEY

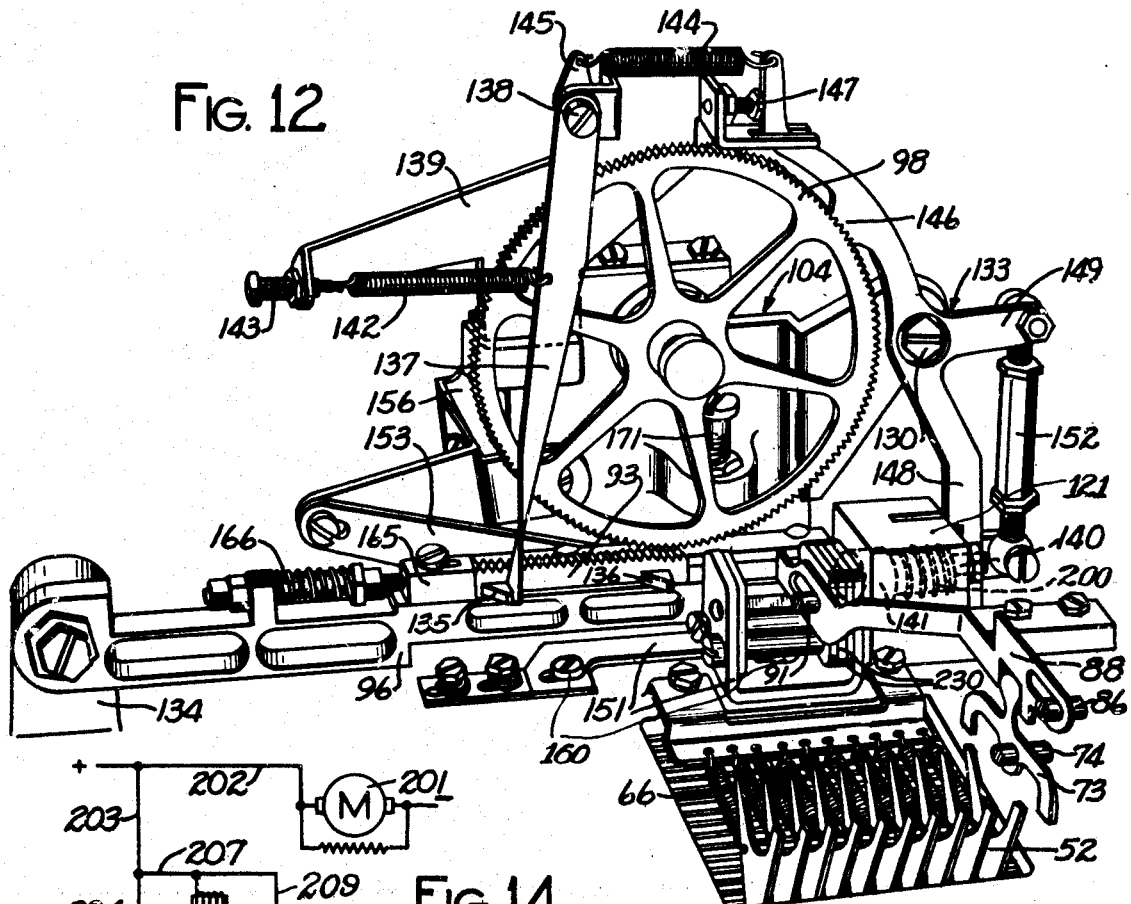

Patented Dec. 11, 1934

1,984,317

UNITED STATES PATENT OFFICE 1,984,317

KEYBOARD PERFORATOR AND COUNTER

Albert H. Reiber and Maurus T. Goetz, Chicago, Ill., assignors to Teletype Corporation, Chicago, Ill., a corporation of Delaware Application March 25, 1932, Serial No. 601,170

23 Claims. (Cl. 164—112)

This invention relates to improvements in typesetting systems and apparatus therefor and in particular to perforators and counters which may be utilized for preparing a perforated tape for the automatic control of composing machines of the linecasting type.

As is commonly known in the typographical art, composing machines of the linecasting type are provided with matrices which consist of small brass units carrying indented characters in their edges and which are of different thicknesses due to the fact that the characters vary in width. Thus, when these matrices are assembled into a line of predetermined, definite length, the number of matrices necessary to complete the line varies with the particular matrices used; the length of the line, therefore, is dependent, not upon the number of characters in the line, but rather upon the thicknesses of the characters or matrices making up the line. Consequently, it is necessary during the preparation of a perforated tape representing lines of composed matter to totalize the various thicknesses of matrices corresponding to the code perforations made in the tape so that the operator will be apprised at all times of the length of line remaining as each key is operated and can thus judge of the justifiability of the line. The indicating mechanism herein shown which is controlled by the counting device is not a part of the present invention, but is a subject of copending application, Serial No. 601,172 filed March 25, 1932 by H. L. Krum et al.

The primary object of the present invention is the provision in a keyboard perforator and counter of a means for effecting the counting operation expeditiously by providing a transfer mechanism between the selecting mechanism and the counting mechanism whereby a substantial overlap of the selecting and counting functions of the apparatus is provided, thereby greatly enhancing the speed of operation of the device.

Another object of the present invention is to provide a keyboard perforator and counter arranged for performing the counting operation in a positive and accurate manner.

Essentially, the present invention comprises a keyboard device intended to be employed in the preparation of perforated tape, the perforations in which represent lines of composed matter; and also to take account of the number of characters or matrices composed so that a continuous totalization of the widths of the characters is effected, whereby the operator is enabled to determine at all times the approach of this total to the end of a predetermined length of line. The device is provided with a keyboard, the arrangement of keys in which is similar to the familiar typewriter keyboard. Within the base of the device are contained two selector mechanisms, one of which controls the perforating and the other the counting function; the latter is the function, previously alluded to, of totalizing the thicknesses of the characters or matrices making up the line and includes the function of indicating to the operator the approach of said totalization to a predetermined length of line.

Both selector mechanisms are operable by the key levers to arrange in proper combinations a set of punch interference bars in the perforator and simultaneously to select through a transfer mechanism one of a series of stop bars in the counting mechanism to control the movement of a unit wheel. A novel escapement means has also been provided to control the variable movement of the unit wheel to correspond to the thickness of the characters composing the line.

A better understanding of the invention may be had from the following description, taken with the accompanying drawings, wherein:

Fig. 2 is a perspective representation of the key lever and selector mechanism arrangement.

Fig. 3 is a longitudinal elevational view of the perforating selector bar unit.

Fig. 4 is a longitudinal elevational view of the counter selector bar unit.

Fig. 7 is a longitudinal sectional view of the operating cam shaft.

Fig. 8 is an elevational view showing the counting mechanism in the normal, unoperated position.

Fig. 9 is a longitudinal sectional view of the unit rack stop.

Fig. 10 is a cross-sectional view taken on line 10—10 of Fig. 8.

Fig. 11 is a sectional view taken on line 11—11 of Fig. 7 illustrating the escapement mechanism adjacent thereto.

Fig. 12 is a perspective view of the counting mechanism.

Fig. 13 is an elevational view showing the counting mechanism in one of its operative positions.

Fig. 14 is a schematic diagram of the electrical circuits for operating the device of the present invention.

The present apparatus embodies primarily a base 1 which is provided at its forward portion with a keyboard of the usual form, and which is adapted to house the key levers and the selector mechanisms operated thereby. Mounted on the base are the auxiliary devices; namely, the perforator, the counter, and the indicator which are selectively controlled by the aforesaid selector mechanisms. All of the auxiliary devices, except the perforator which is electrically operated, are driven by a motor which is appropriately mounted on the base in position to effect the rotation of a single operating shaft. All the parts are thus suitably supported in such a manner as to form a compact self-contained unit.

Figure 1:
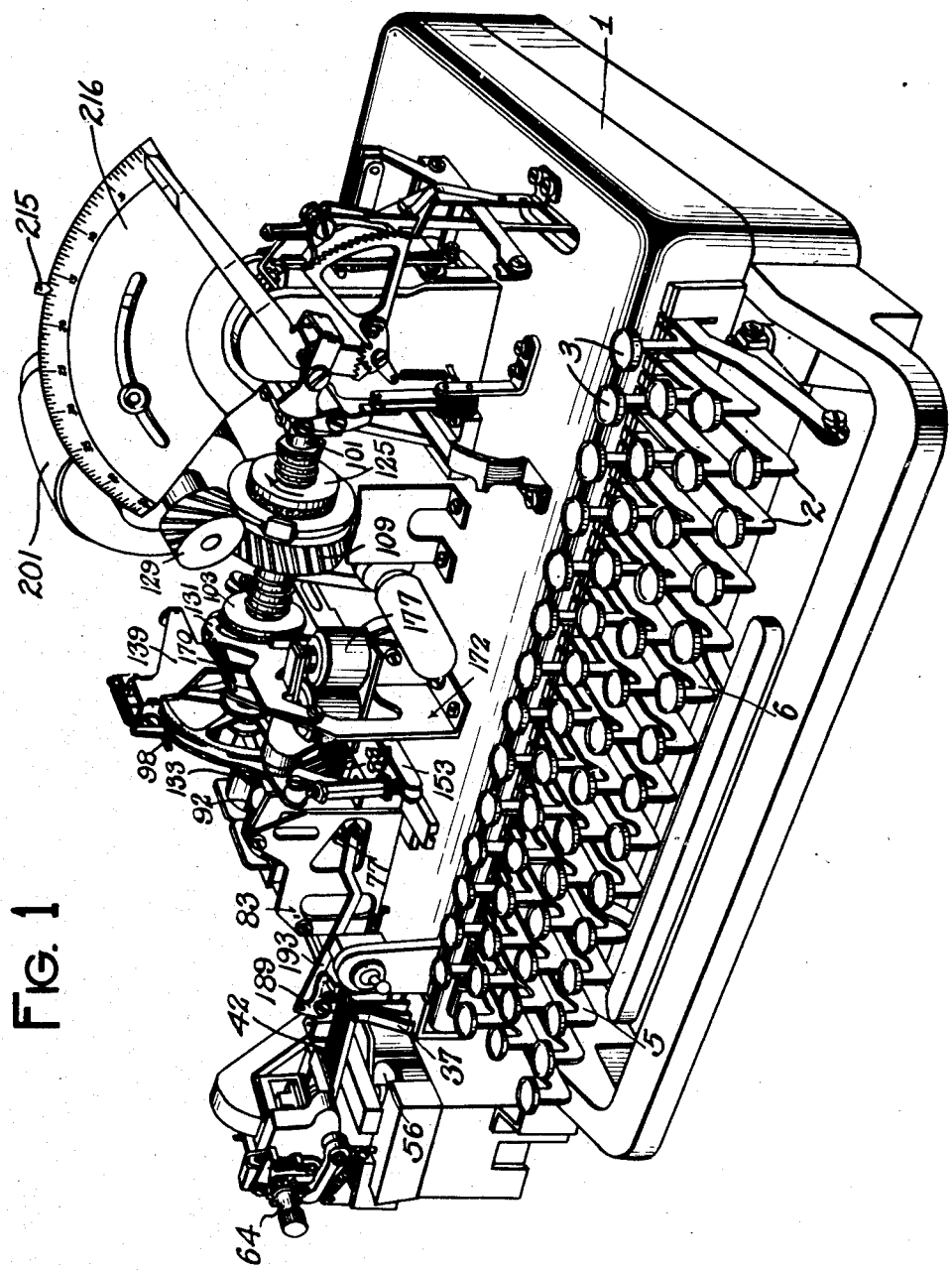
Fig. 1 is a perspective view of a keyboard perforator and counter according to the invention.

Referring to Fig. 1, the base 1, as mentioned, is provided at its front with a keyboard comprising key levers 2 operated by keys 3. The key levers 2 extend interiorly of the base 1, and as illustrated in Fig. 2, are pivotally carried on a common pivot rod 4 appropriately mounted therein. A shift lever 5 and an unshift lever 6, however, are not carried by the common pivot rod 4, but are independently mounted on the base 1 on pivots 7 and 8, respectively. Each of the key levers 2 is provided with a return spring 9 for returning the associated lever to its normal position after it has been operated.

A code bar 12 is juxtapositioned to each of the key levers, except the function key levers including the shift and unshift key levers, and is slidably supported at its forward end on stud 13 integral with the key lever. The rear end of each code bar 12 is pivotally carried on a common pivot rod 14 mounted in a rocker member 15 and is carried on a pivot shaft 16 suitably journaled in the base 1.

To the rear end of key levers 5 and 6 are pivotally connected links 17 and 18, respectively, which in turn are pivotally connected to brackets 19 and 21 affixed to the rear and front, respectively, of rocker member 15. Thus, member 15 is rendered rockable towards the front and rear alternatively by the levers 5 and 6, respectively. As member 15 is rocked, all of the code bars 12 are shifted simultaneously. In the present embodiment, each code bar 12 is provided with two teeth or projections 65 (Fig. 2) so arranged that when one of the teeth is in operative relation with its associated selector bar 43 the companion tooth will be disposed above and to one side of its associated selector bar so as not to be in operative relation therewith until the respective code bar is shifted to the alternate position. Thus, when the code bars 12 assume their forward or unshift position (as viewed in Fig. 2) the tooth on each code bar which corresponds to the thickness of the lower case character will be operative; and, when the code bars 12 assume their rearward or shift position the companion teeth thereon will become operative, which teeth correspond to the thicknesses of the upper case characters.

Selector unit 23 comprises a plurality of pairs of permutation bars 25 and 26, the upper edges of which are provided with notches. Each pair of permutation bars 25 and 26 rests upon a pair of rocker members 27 and 28, Fig. 3, which are mounted upon common rods 31 and 32, respectively. Each rocking member 27 and 28 is provided with an ear extending forward to support a bar 25 and another ear extending rearward to support the companion bar 26. The rocking members 27 and 28 are pivotally connected at 33 and 34, respectively, to a horizontal bar 35 which is provided at its left hand end, Fig. 3, with an ear 36 adapted to engage a notch in an associated lever 37. Permutation bars 25 and 26 are adapted to be guided against lateral movement in suitable slots in end members 38 and 39 (Fig. 2). Levers 37 are pivotally mounted on common pivot 41 (Figs. 2 and 5) carried in the base 1 and are adapted at their upper ends to engage notches in punch interference bars 42.

Selector unit 24 comprises a series of bars 43 each of which is carried by a pair of bell cranks 44 and 45 (Figs. 2 and 4) which are pivotally carried on pivot rods 46 and 47, respectively. Each member 44 and 45 is provided with a rearwardly extending ear 48 on which the bars 43 are carried. If desired bell cranks 44 and 45 may be positioned relative to bars 43 similarly to the positionment of members 27 and 28 relative to bars 25 and 26 in Fig. 3. The ends of the depending arms of each bell crank 44 and 45 are pivotally connected to a horizontal bar 49 which extends beyond the left hand connection, and the end of which is provided with an ear 51 adapted to fit into a notch in an associated Y-shaped lever 52, a series of which is mounted on a common pivot shaft 50 supported in the base 1. The bars 43 are maintained in spaced relation and are slidably held in guide combs 53 mounted on the base of the selector unit 24 (Fig. 2). A description of the operation of the key lever and selector mechanisms will now be given. Upon depression of a key 3, its key lever 2 will be caused to rotate about the pivot shaft 4 against the action of spring 9 and will engage the upper edges of permuted combinations of the permutation bars 25 and 26 which will thereby be depressed. It will be understood that for each key depressed a different combination of permutation bars will be operated. When a permutation bar 25, for example, is depressed, its lower edge engages with ears 54 of rocker members 27 and 28, causing the latter to rock on their pivots 31 and 32, producing at the same time an upward movement of the other ears of the rocker members and consequent upper movement of the companion permutation bar 26. This upward movement of the bar 26 is permitted by reason of the fact that the upper edge of the bar 26 is notched at points where the upper edge of the bar 25 is not notched, and vice versa. The permutation bars are guided to move vertically by the guide members 38 and 39, previously mentioned.

Figure 5:
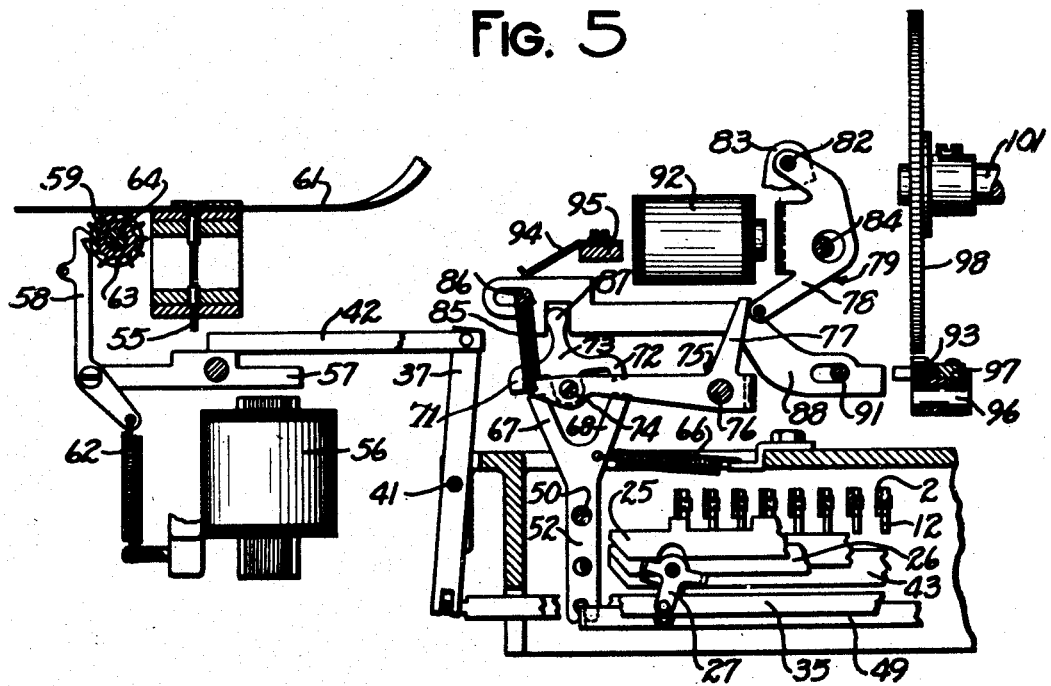
Fig. 5 is a diagrammatical sectional view showing the perforator and the transfer mechanism.

The permutation bars 25 which have been depressed by the operated key lever 2 rock their associated rocking members 27 and 28 to swing in turn the associated bars 35 to the right, thereby rotating the associated levers 37 counterclockwise and the interference bars 42 to the left, positioning the interference bars beneath the punches 55 (Fig. 5).

An electromagnet 56 will then be energized by establishing a circuit, as indicated in Fig. 14, from positive battery over wires 203 and 204, through contact 205 (when closed), winding of magnet 56, over wire 206, through contact 178, thence to ground. Energization of magnet 56 rocks the armature 57 clockwise, forcing the interference bars upward against the punches 55 to perforate the tape 61. Simultaneously with the perforating operation, pawl 58 will move up to engage the next tooth of ratchet 59. When the magnet is deenergized, spring 62 draws the pawl down, rotating the ratchet 59 and feed roller 63 (both of which are affixed to the same shaft 64) one step, thus feeding the tape in a well known manner to position it for the next perforating operation. In this manner the tape is perforated in accordance with the operation of the key lever 2. The previously depressed bars 25 will be returned to their upward position by the next key operated, provided the corresponding hole is not to be perforated, since the operated key lever will engage the high part of a bar 26. If the corresponding hole is to be perforated, the bar 25 will remain in its downward position.

Simultaneously with the operation of the key lever 2 occurs the rotation of its associated code bar 12 about the pivot rod 14 which is effected by means of the slot and pin connection 13 between bar 12 and key lever 2, as previously described. This movement of code bar 12 brings one of the projections or teeth 65, which is in register with a corresponding selector bar 43, in contact therewith to cause a selector bar to be depressed, thereby effecting the rotation of bell crank levers 44 and 45 in a counterclockwise direction (Fig. 4) to move bar 49 to the right, which movement is imparted to the Y-lever 52 to rotate it in a counterclockwise rotation against the action of its spring 66.

As indicated in Fig. 5, arms 67 and 68 of each Y-lever 52 are adapted to operatively engage with projections 71 and 72, respectively, of a transfer lever 73 associated with each Y-lever 52. Each transfer lever 73 is in vertical alignment with the Y-lever 52 below it and is pivotally mounted on a common pivot shaft 74 carried by a transfer bail 75 pivotally mounted on a shaft 76. The transfer bail 75 is provided at one end with an upwardly directed arm 77 which cooperates with arm 78 of armature lever 79 which is pivoted at 82 to the transfer magnet frame 83. The movement of the armature lever 79 is limited by a pin 84 which operates within a larger hole in the armature lever 79. The transfer bail 75 normally tends to rotate in a clockwise direction by means of a spring 85 attached to one end of the bail 75, the other end of the spring being secured to a rod 86 mounted in the frame 83. This rotation of the transfer bail 75 tends to impart through arm 77 movement in an opposite direction to armature lever 79, thus, holding lever 79 against the stop pin 84.

Each of the transfer levers 73 is provided with a head 87 projecting into a slot of a stop bar or extent member 88 individual thereto, one such stop bar being provided for each of the transfer levers 73. Stop bars 88 have a normal position, as indicated in Fig. 5, and are adapted to be slidably mounted upon rods 86 and 91. In their operative positions the projections 71 or 72 of the transfer levers 73 are disposed directly above the arms 67 or 68 of the Y-levers 52. Thus, when the transfer magnet 92 is energized, armature lever 79 is attracted and through arm 78 imparts counterclockwise rotation to the bail 75. The transfer levers 73 accordingly are brought into engagement with the Y-levers 52. The projections 72 of the transfer levers engage the arms 68 of the Y-levers and cause the transfer levers to rotate about their projections 72 as a fulcrum in a counterclockwise direction and cause the stop bars 88 to be urged to the left.

Now, when a Y-lever 52 has been selected and caused to rotate in a counterclockwise direction against the action of spring 66, the transfer magnet 92 is caused to be energized simultaneously, thus imparting a counterclockwise rotation to the transfer bail 75, as previously described. However, the arm 67 of the selected Y-lever will now engage projection 71 of its associated transfer lever 73 and the continued movement of the transfer bail 75 will cause the transfer lever to rotate in a clockwise direction about its projection 71 as a fulcrum, causing its associated stop bar 88 to be moved toward the right so that its right hand end will be projected into the path of a unit wheel rack 93 (Fig. 12), the effect of which will hereinafter appear. The stop bars are adapted to be maintained in their right or left positions by means of the pressure exerted upon them by individual detent springs 94 (Fig. 5) suitably carried on the bar 95 of the frame 83.

The unit rack 93 is slidably mounted on a unit rack slide 96 and adated to be interlocked in slidable relation therewith by guide member 97, more clearly indicated in Fig. 10. Disposed above the unit rack 93 (Fig. 5) is a unit wheel 98 which is rotatably fixed on an operating shaft 101 (Figs. 5 and 8). As indicated in Fig. 7, the operating shaft 101 is suitably journaled in bearings 102 and 103 carried in brackets 104 and 105 mounted on the base 1. There is loosely mounted on shaft 101 adjacent to bracket 104 a sleeve member 106. Thus in the present embodiment the bracket 104 is interposed between the unit wheel 98 and the sleeve member 106. Between the sleeve member 106 and the bracket 105 and fixedly mounted on the shaft 101 is a flanged sleeve 107.

Sleeve member 106 is provided near its right end (as viewed in Fig. 7) with a flange 108 to which are secured, by means of screws, a gear 109 and a disc 111 which are also carried on the sleeve member 106. Member 106 is also arranged with a pair of diametrically disposed keyways, extending from its left end approximately to the flange 108, which are adapted to receive corresponding projections in a pair of disc members 112 and 113 slidably mounted on said sleeve member, whereby the disc members are rendered rotatable therewith. A member 114 provided with two integral portions; namely, cam 115 and stop disc 116, is interposed between the disc members 112 and 113. The functions of the cam member 115 and stop disc 116 will hereinafter appear. Between member 114 and each of the adjacent disc members 112 and 113 is disposed a disc of friction material 120. That part of the sleeve member 106 adjacent to disc 112 is threaded to receive a nut 117 and locknut 118. Adjacent to disc 113 is a helical spring 119, the compression of which is adjustable by means of a collar 122 screwed to sleeve 106. With this arrangement it is seen that the member 114 is adjustably carried and frictionally connected to sleeve 106.

The flange of the sleeve 107 forms a part of a friction clutch composed of a drive disc 123, discs of friction material 124, and disc 125. Pressure is imparted to this friction clutch by means of a helical spring 126, which is adjustable by means of a nut 127 carried on the sleeve 107. A drive connection is provided between the gear 109 and the clutch just described by means of the interengagement of lug 128 integral with disc 111 with a corresponding notch in the disc 123.

Continuous rotation is imparted to the gear 109 by means of a motor through a pinion 129, and similar rotation is thereby imparted to the sleeve member 106. The member 114, however, is held from rotation by means of an escapement pawl 131 shown in Fig. 11. Sleeve member 107 and shaft 101 which constantly tend to rotate are restrained therefrom by the cooperation of the escapement means which is associated with the unit wheel 98. When the escapement means, which comprises rack 93 and pawl 133 (Fig. 12) is operated, as will presently appear, the unit wheel 98 is permitted to rotate variable amounts depending upon which one of the stop bars 88 is operated. The shaft 101 extends to the right beyond the bracket 105 and carries at its right end a pinion 132 affixed thereto which controls the operation of the indicating device set forth in the aforementioned copending application, and thus will not here be described. Briefly, the variable rotation imparted to pinion 132 by the counting mechanism, presently described, is in turn imparted to the index hand 215 (Fig. 1), the reverted end of which is caused to move along the arcuate edge of the dial 216 to indicate the cumulative thicknesses of the characters.

*Matrix thickness counting mechanism*

As already noted, the matrices utilized in linecasting machines are of different thicknesses since the characters corresponding thereto vary in width; therefore, the number of characters which will fit in any portion of a line varies with the thicknesses of the individual characters. The device for counting or totalizing the thicknesses of the matrices composed in the line will now be described. By reason of its frictional relation to gear 109, the unit wheel 98 constantly tends to rotate. However, its rotation is controlled normally by a pawl member 133 and unit rack 93, one or the other of said members being in engagement with the unit wheel during the counting operation.

Briefly, during the counting operation the pawl 133 and rack 93 are operated so as to bring rack 93 into engagement and pawl 133 out of engagement with unit wheel 98 substantially simultaneously (a slight overlap being provided to prevent the escape of the unit wheel), the effect being to permit the unit wheel 98 to carry the unit rack 93 toward the right (as viewed in Fig. 12) until it is arrested by a selected one of stop bars 88, at which time pawl 133 is again brought into engagement and rack 93 out of engagement with unit wheel 98 substantially simultaneously, thus preventing further rotation of unit wheel 98, while unit rack 93 returns to its original position.

Having reference to Figs. 8, 12 and 13 it will be noted that the rotation or escapement of unit wheel 98 is controlled by the aforementioned unit rack 93 and the pawl member 133. As previously described, the unit rack 93 is slidably carried on the unit rack slide 96 which is pivotally carried on bracket 134 integral with the base 1. The unit rack is provided with a pair of lugs 135 and 136. The right hand lug 136, as viewed in Fig. 12, cooperates with the stop bars 88, while the left hand lug 135 coacts with a spring actuated return lever 137 pivotally mounted at 138 to a bracket 139. The tension of a spring 142 which actuates the return lever 137 is adjustable by means of a screw 143 mounted in bracket 139.

Pawl member 133 is pivotally mounted at 130 on the bracket 104 and tends to rotate in a counterclockwise direction due to the action of a spring 144, one end of which is secured to the upper extremity of the pawl member 133, and the other end being attached to a spring clip 145. Pawl member 133, which is provided with a toothed portion 146, thus is held in engagement with the teeth on the unit wheel 98 by means of spring 144. An adjustable stop 147, however, is provided whereby the degree of engagement between the toothed portion 146 and the unit wheel may be controlled; that is, it is desirable to prevent the teeth in the pawl member 133 from bottoming when they engage with the teeth in the unit wheel 98 to preclude damage thereto from wedging.

Depending from the pawl member 133 is a portion 148 which is provided with a laterally disposed end 150 (Figs. 8 and 13) adapted to cooperate with the extremity of the unit rack slide 96. The pawl member 133 is also arranged with an arm 149 to the outer end of which is pivotally connected one end of link 152, the other end of which is pivotally connected to the end of lever 153 which in turn is pivoted at 154 to the slide member 96. The opposite end of lever 153 is pivotally connected to arm 155 of operating lever 156 which is supported pivotally at 157 to the bracket 104. Operating lever 156 is also provided with two arms 158 and 159. At the extremity of arm 158 is carried a follower roller 161 which coacts with the cam 115. A follower roller 162 is also carried at the extremity of arm 159 of the operating lever 156 and is adapted to cooperate with a pair of cam portions 163 and 164 diametrically opposed to each other and which are secured to the face of the cam 115. Cam 115 is provided with two similar cam surfaces since two complete operations are performed during one complete revolution of the cam; that is, for one complete operation the shaft and cam are permitted to rotate one-half revolution, thus enhancing the speed of operation of the apparatus.

Upon the initiation of the rotation of cam 115 the follower roller 161 is acted upon by the periphery of the cam 115 so as to impart clockwise rotation to the operating lever 156. Arm 155 of the operating lever 156 thus is raised and in so doing lever 153 is caused to rotate about its pivotal connection with link 152 thus elevating the pivot 154 between the lever 153 and the unit rack 45 slide 96. Slide 96 thus is elevated so as to bring the unit rack 93 into engagement with the unit wheel 98. The continued rotation of the operating lever 156 in a clockwise direction causes the lever 153 to rotate about its pivot 154 as a fulcrum in which event the link 152 is given a downward movement which in turn imparts clockwise rotation to the pawl member 133 about its pivot 130 against the action of spring 144. The lateral portion 150 of the pawl member 133 is now disposed beneath the end of the unit rack slide 96 as indicated in Fig. 13, to insure, during the ensuing operation of the escapement means, the engagement of pawl 133 with unit wheel 98 prior to the disengagement of rack 93 to preclude the undue escapement or movement of unit wheel 98 which would otherwise be liable to occur. In effect, the portion 150 performs the function of a safety device.

The unit wheel, which constantly tends to rotate by virtue of being fixed to shaft 101, is thus released for rotation and the unit rack being free to move is carried toward the right until the lug 136 is intercepted by one of the stop bars 88. At this point the cam portion 163 acts upon the follower roller 162 so as to suddenly reverse the direction of rotation of the operating lever 156. The unit rack slide 96 cannot at this time be lowered because of the engagement of its forward extremity with the lateral portion 150 of the pawl member 133. Therefore, lever 153 is caused to rotate in a counterclockwise direction about the pivot 154, thus causing the link 152 to be elevated which in turn permits pawl member 133 to rotate in a counterclockwise direction, due to the action of its spring 144, into engagement with the unit wheel 98, simultaneously causing the withdrawal of lateral portion 150 from engagement with slide 96.

The continued rotation of the operating lever 156 in a counterclockwise direction now causes the lever 153 to rotate about its pivotal connection to link 152 in a counterclockwise direction to withdraw the unit rack 93 from engagement with the unit wheel 98. The unit rack 93 is thereupon placed under the influence of the spring actuated return lever 137 and is carried toward the left thereby to its stop 165. The stop 165 is adapted to be cushioned by a compression spring 166 as indicated in Figs. 8, 9, 12 and 13.

The cushioning means is more clearly shown in Fig. 9 wherein it is seen that the stop 165 is provided with a cylindrical stem portion 167 threaded at its extremity and which is adapted to extend through and beyond a vertical lug 168 of slide 96. Mounted on the stem 167 between the lug 168 and the stop 165 is a sleeve member 169, and encircling said sleeve member is the helical compression spring 166. Thus, it is seen that any pressure exerted against the stop 165 in an axial direction will be resisted by the compression spring 166. The motion of the sleeve member 169, and hence stop 165, is adjustable by means of a nut and locknut on the threaded end of stem portion 167.

A limiting means 171 (Fig. 12) is provided for the unit rack slide 96, whereby the upward movement of the slide is restricted to the extent of preventing the teeth in the unit rack 93 from bottoming in the teeth of the unit wheel. The utility of the limiting means 147 and 171 will become apparent when it is understood that the operation of the mechanism is very rapid and the movements of the individual parts are very sudden and consequently there is a possibility that the teeth in the unit rack and pawl member might wedge into the teeth in the unit wheel, the smallness or fineness of the teeth in these various members being necessary due to the precision required in the counting operation. Furthermore, the stop 171 by its limiting action on unit rack slide 96 plays an important part in the operation of the unit rack 93 by eliminating the friction of the unit rack 93 on the slide 96 which would otherwise be present if rack 93 were permitted to be pressed into engagement with unit wheel 98, and which would render the mechanism either sluggish or even inoperable if the pressure were too great.

Likewise, due to the rapid movement of the rack 93 and the sharp impact of its lug 136 against a selected stop bar 88, a cushioning means is provided which is housed in the member 121 (Fig. 12). The primary function of this cushioning means is to prevent the rebound of the rack 93 when it strikes against the stop members 88, the shock or impact being absorbed by a helical compression spring 200 carried on a plunger 140, having an enlarged end 141 and a threaded end carrying a nut and locknut, the spring 200 being compressed between the end 141 and the wall of the housing 121, and the movement of the plunger 140 to the left being constrained by the nut thereon. The stop bar support 151 is guided by screws 160 engaging slotted holes therein and is thus adapted to cooperate with the cushioning means. The use of the cushioning means also precludes the possibility of deforming, or shearing off, the ends of the stop bars 88.

*Escapement mechanism*

To enhance the speed of operation of the apparatus herein described, an escapement mechanism has been provided whereby the amount of rotation of the operating cam 115 to effect a complete cyclic operation of the apparatus is limited to 180° or one-half revolution; thus, as previously alluded to, the cam 115 is provided with two similar cam surfaces.

The rotation of the shaft 101 is controlled by the electromagnetically operated escapement means shown in Figs. 1 and 11. As will be remembered, the member 114 is provided with an integral cam portion 115 and an integral stop disc 116. The stop disc 116 is provided on its periphery with two diametrically opposed teeth since two complete operations are performed for each complete revolution of the member 114.

As indicated in Fig. 11, there is associated with the stop disc 116 an escapement member 131 which is pivotally secured to the bracket 172 mounted on the base 1. The stop disc normally tends to rotate in a counterclockwise direction as viewed in Fig. 11 and the escapement member 131 is normally held in engagement with the lower tooth 173 of the stop disc by the action of spring 170 one end of which is secured to the escapement member 131 and the other end being attached to the extension 175 of the bracket 172.

Integral with the escapement member 131 is an armature portion 176, associated with which is the electromagnet 177 also suitably mounted on the bracket 172. When magnet 177 is energized, armature 176 is attracted thereto, causing the escapement member 131 to rotate slightly in a counterclockwise direction to effect the disengagement of the lower arm of the escapement member from the tooth 173 of the stop disc 116 whereupon the stop disc and cam 115 are permitted to rotate as indicated by the arrow until tooth 173 is intercepted by the upper arm of the escapement member. When magnet 177 is deenergized, the escapement member returns again to its clockwise position under the action of spring 170 to release the upper arm from the tooth 173 and to introduce the lower arm into the path of the companion tooth 174 on the disc member. The electromagnet 177 is caused to be energized by the closing of a contact 178 (Fig. 6) controlled by each one of the key levers 2.

Thus, the initiation of the rotation of member 114 is controlled by each one of the keys, and the amount of rotation of the member (namely, one-half revolution for each operation) is controlled by the escapement mechanism just described. However, a means is provided to interrupt the circuit for the escapement magnet 177 during certain operations—for example, functions which in the present application pertain to operations other than counting—in which event the counting operation is not required. The key levers that control the so-called functions operate an additional pair of selector bars 179 (Fig. 2) which control the horizontal bar 181. The right end of bar 181 is laterally disposed to cooperate with a normally closed contact 182 appropriately mounted in the base. So, when a function key is depressed the contact 178 (which is invariably operated) is closed, but the contact 182 is opened substantially simultaneously or slightly previous, so that the escapement mechanism is rendered inoperative, while the remaining operations controlled by the operated function key proceed uninterruptedly.

Positive contact control

To insure the energization of the various operating magnets, notwithstanding the speed of operation of the keys by the operator, a positive latch control has been provided for the main operating contact, which latch is adapted to be automatically released only upon the complete or effective energization of the magnets.

Each one of the keylevers controls a single selector bar 180 (Fig. 2) which is invariably operated each time a key lever is depressed. Having reference to Fig. 6 a lever 183 associated with a selector bar 180 is shown mounted on the pivot shaft 41. The lower extremity of this lever is pivotally articulated to a horizontal bar 184 similar to bars 35 shown in connection with levers 37 in Fig. 3. The upper extremity of lever 183 is provided with a lateral portion 185 and an angular portion 186. A contact screw 187 is adjustably carried on the angular portion 186 to coact with the spring contact 178 suitably carried on the frame 83. Lever 183 normally tends to rotate in a clockwise direction as viewed in Fig. 6 under the action of spring 188 and is held thereby against a stop 190; thus, contact 178 is normally open. A latch member 189 is provided to co-operate with the lateral portion 185 of the lever 183. This latch member is rotatably carried on the stud 191 and tends to rotate in a clockwise direction due to the action of a spring 192. Latch member 189 is also provided with a vertical arm to which is pivotally articulated one end of link 193, the other end of which is pivotally connected to the arm 78 of the armature lever 79.

Whenever a key lever is depressed the lever 183 is caused to rotate in a counterclockwise direction against the action of spring 188 to effect the closing of contact 178. Lever 183 is maintained in its counterclockwise position and contact 178 is held closed by means of the engagement of latch 189 with lateral portion 185. The reason for this detention is to insure the energization of the perforating magnet 56, the transfer magnet 92, and the escapement magnet 177 in case the key lever should be released too quickly. It is obvious, therefore, that the duration of energization of these magnets is independent of the operation of the key lever. When the transfer magnet is energized, however, the consequent attraction of armature lever 79 will cause the link 193 to be actuated toward the left as viewed in Fig. 6, which movement will be imparted to the latch member 189 rotating it in a counter-clockwise direction to effect the release of the latch arm thereof from the lateral portion 185, thus releasing lever 183 which will thereupon be urged to its normal clockwise position by the spring 188.

Electrical circuit

The electrical circuit to control the various functions of the apparatus is shown in Fig. 14, in which the various elements are located substantially as they would appear in a plan view of the device. The circuit for the motor 201 extends from positive battery over wire 202, through the winding of motor 201 to negative battery. The circuit for the perforator electromagnet 56 extends from positive source of current over wires 203 and 204, through the manually operated contact 205, (when closed) thence through the winding of the electromagnet 56, over wire 206, through contact 178 to ground. The utility of the manually operated contact 205 will presently be described. The circuit for the transfer electromagnet 92 extends from positive battery over wires 203 and 207, through the winding of electromagnet 92 over wires 208 and 206, thence through the contact 178 to ground. The circuit for the escapement electromagnet 177 extends from positive battery over wires 203, 207, and 209 through the winding of the electromagnet 177, then over the wire 211 through the normally closed contact 182, over wires 212, 208, and 206, through contact 178 to ground.

The usefulness of the manually operated contact 205 will become apparent when it is understood that at times the operator finds it necessary to count out the remaining portion of the line he is composing to determine if the matter will fit therein. To do this he wishes to disable the perforator without affecting the counting mechanism. Therefore, when he desires to perform the operation of thus counting out the line, he merely breaks or opens the contact 205 and proceeds as if to compose the line, and if he discovers that the line will properly justify, he closes the contact 205 and repeats the latter operation, which at this time will effect the perforator. This will, of course, also actuate the counting mechanism; but, since the possibility of justification of the line is already determined, the duplicate operation of the counting mechanism is in this event merely incidental.

In the operation of the apparatus herein described there is a slight time interval provided between the closing of contact 182 and the main operating contact 178 so that the circuit controlled by contact 182 may be first prepared and thereafter established by the closing of contact 178. The main operating contact 178 is provided with a resistance 213 and a condenser 214 for spark protection. The contact 182, as previously described, is operated by the bar 181 in the selector mechanism also shown in Fig. 2. This bar 181 is actuated only upon the operation of a function key at which time the escapement mechanism, which initiates the operation of the counting device, is disabled, due to the breaking of the circuit which energizes the escapement magnet 177.

General operation

The details of the apparatus having been described, a better understanding of the general operation thereof may now be obtained from a description of particular key selections and the various operations incident thereto.

Referring to Fig. 1, the key-tops 3 are provided with indicia (not shown) analogous to the well known typewriter keyboards, wherein two sets of designations are provided, one for the lower case and the other for the upper case. Assuming that the code bars 12 (Fig. 2) are in their forward or lower case position, and that a character key lever 2 has been operated, a permuted combination of bars 25 and 26 in selector mechanism 23, and one of the bars 43 in selector 24 will be simultaneously depressed. The selection of bars 25 and 26 will effect through rocking members 27 and 28 and horizontal bars 35 the selection of levers 37 and punch interference bars 42 in corresponding permuted combinations.

Figure 6:
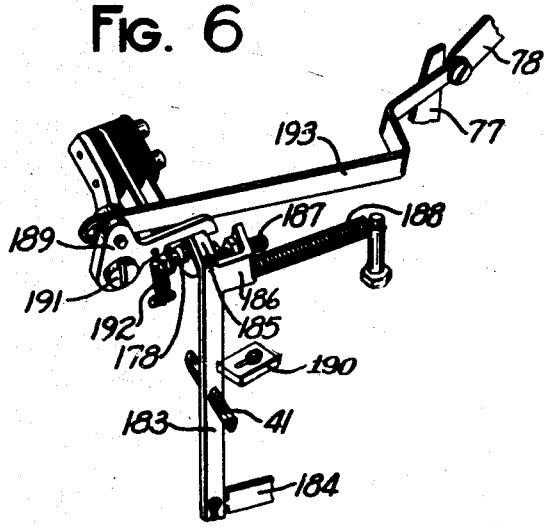
Fig. 6 is a perspective view of the positive contact control.

At the same time, one of the projections 65 of the selected code bar 12 will cause the depression of that bar 43 in selector mechanism 24 which represents the thickness of the matrix corresponding not only to the key operated, but also to the shift condition of the code bars 12; that is, each key represents two characters (except function keys), one in the lower case and one in the upper case, which characters may possibly be of different thicknesses and thus require a different counter bar 43 to be selected so as to operate the counting mechanism differently. The depression of bar 43 will effect through levers 44 and 45 and horizontal bar 49 the oscillation of associated Y-lever 52. Simultaneously with the depression of selected bars 25, 26 and 43 will occur the depression of universal bar 180 (Fig. 2), which near the completion of the key stroke effects the closing of the main operating contact 178 (Fig. 6). The time of closure of contact 178 is so regulated by the adjusting screw 187 as to insure the prior selection of levers 37 and 52 and punch interference bars 42.

The closing of contact 178, as noted in Fig. 14, effects substantially simultaneously the energization of perforator magnet 56, transfer magnet 92 and escapement magnet 177 (of course, it is understood that the closing of the manually operated contact 205 is a condition precedent to the operation of the apparatus). The energization of electromagnet 56 effects the perforation and feeding of the tape, as previously described. The energization of electromagnet 92 effects the operation of the transfer mechanism or transitional means, and consequently, the transfer of the selection of Y-lever 52 to the stop bars 88 in the following manner. The operation of electromagnet 92 causes, by its attraction, the clockwise rotation of armature lever 79 (Fig. 5) to in turn impart opposite rotation to transfer bail 75. Since the selected Y-lever 52 has been oscillated to the left, its arm 67 is disposed below arm 71 of the transfer lever 73. Thus, the operation of bail 75 causes arm 71 to engage arm 67 and consequently lever 73 is rotated about the end of arm 71 as a fulcrum to effect the movement of the associated stop bar 88 toward the right into the path of lug 136 on the unit rack 93.

The energization of escapement magnet 177 permits the operating cam 115 to revolve 180°, as hereinbefore described, to effect the disengagement of unit wheel pawl 133 from, and engagement of unit rack 93 with the unit wheel 98 (Fig. 13), thus releasing the unit wheel for rotation to impart tangential movement to the unit rack 93, which motion is arrested when lug 136 abuts a selected stop bar 88. The extent of rotation of unit wheel 98 and movement of the unit rack 93 is determined by the particular stop bar 88 selected, and is proportional to the thickness of the matrix or character corresponding to the key lever depressed. This movement is transferred through shaft 101, pinion 132 and gear (not shown) in mesh therewith, to the index hand 215 and is indicated on the dial 216, as fully described in said copending application.

Now, if it is desired to perforate and count an upper case character it is first necessary to depress the shift key lever 6, in which event the member 15 (Fig. 2) will be rocked rearwardly and the code bars 12 will assume their rearward position. Since the shift operation is what is termed a "function", no counting operation is necessary because there is no matrix or character corresponding thereto. Therefore, since the perforating operation proceeds as usual, it becomes necessary to disable the counting mechanism.

To do this, an additional pair of permutation bars 25 and 26 is provided which are operable only by "function" keylevers, as previously alluded to. Thus, when a function key lever (as in the present instance, the shift key lever 6) is operated, it effects through its associated horizontal bar 181 (analogous to bars 35 and 49), Figs. 2 and 14, the opening of the normally closed contact 182. Consequently, the closing of the main operating contact 178 (which is operated invariably) will, in this event, establish the circuits for the perforating magnet and transfer magnet only. The energization of the perforating magnet effects the perforating operation to thereby punch and feed or step the tape in the regular manner. It will be recalled that the purpose of always operating the transfer magnet simultaneously with the perforating magnet is to effect the unlatching of the operating contact 178, Fig. 5.

Thus, the depression of character keys following the operation of the shift key will affect the various devices in a manner similar to their operation prior thereto, except that the counting mechanism will be operated to different extents or amounts for the same key lever.

Although the present invention has been disclosed in connection with perforators and counters, it is, of course, understood that the invention is capable of embodiment in many and widely varied applications other than that specifically disclosed without departure from the spirit and scope of the invention as defined in the appended claims.

What is claimed is:

1. In a keyboard apparatus, a counting device comprising a single unit wheel and means to variably control the operation of said unit wheel, a selector mechanism associated with said device, a series of key levers, a corresponding series of code elements, each of said code elements adapted to be actuated by its corresponding key lever to selectively operate said selector mechanism, and means to effect the storage and subsequent transfer of the condition set up in the selector mechanism to the counting device to permit the subsequent operation of the storing means during the operation of the counting device.

2. In a keyboard device, a counting device, a plurality of elements, a selector mechanism, a series of key levers, a code member individual to each key lever, each of said code members adapted to be actuated by its corresponding key lever to operate selectively said selector mechanism, and means to effect the storage of the setting of said selector mechanism and the subsequent transfer of said setting to said elements to control the extent of actuation of said counting device to permit the subsequent operation of the storing means during the operation of the counting device.

3. In a keyboard device, a counting device, a plurality of elements, a selector mechanism, a series of key levers, a code member individual to each key lever, each of said code members adapted to be actuated by its corresponding key lever to operate selectively said selector mechanism, and abutting means to impress upon said elements the condition established in said selector mechanism to control the extent of actuation of said counting device and to permit the subsequent operation of the abutting means during the operation of the counting device.

4. In a keyboard perforator, a perforating device, a counting device including a plurality of extent members therefor, a series of key levers each operable to effectuate the operation of said devices simultaneously, a series of selector levers associated with said counting device, a corresponding series of transfer levers associated with said extent members, and means effective through the cooperation of said levers to impress upon said extent members the condition established in said selector mechanism to control the actuation of said counting device.

5. In a keyboard perforator and counter, a plurality of selector mechanisms arranged in the same plane, a series of key levers, a corresponding series of code elements juxtapositioned to said key levers and arranged transversely of said selector mechanisms, a transfer mechanism, two series of elements, one series controlled by said key levers directly through one of the selector mechanisms to control the perforating operation, the other series controlled by said key levers through the instrumentality of said code elements and said transfer mechanism to control the counting operation, and means controlled by said keys to perform said operations simultaneously.

6. In a keyboard device, a plurality of keys, a counting device comprising a single unit wheel which constantly tends to rotate, a series of stop bars adapted to control the extent of actuation of said counting device, a transfer device comprising a plurality of sets of abutting members, and a selector mechanism operatively associated with said keys and adapted through the instrumentality of the abutting members of said transfer device to control said stop bars according to the key depressed.

7. In a keyboard perforator, a perforating device, a counting device, a series of key levers each operable to effectuate the operation of said devices simultaneously, a series of selector levers associated with said counting device, a corresponding series of transfer levers, and means effective through the abutting relation between said selector levers and said transfer levers to permit the initiation of the succeeding operation prior to the completion of the previous operation of said devices.

8. In a keyboard device, a counting device comprising a series of members adapted to control the extent of actuation thereof, a selector mechanism, a series of keys, means to establish a condition in said selector mechanism to correspond to the key operated, and abutting means to impress the condition on said members to permit the subsequent operation of the abutting means during the operation of the counting device.

9. In a keyboard device, a counting device comprising a series of members adapted to control the extent of actuation thereof, a selector mechanism, a series of keys, means to establish a condition in said selector mechanism to correspond to the key operated, and means to store and subsequently transfer said condition to said members to permit the subsequent operation of the storing means during the operation of the counting device.

10. In a keyboard perforator, a perforating device, a counting device comprising a series of members adapted to control the extent of actuation thereof, selector mechanisms associated with each of said devices, a series of keys, means to establish independent conditions in said selector mechanisms to correspond to the key operated, means comprising a plurality of sets of abutting members to transfer the condition in one of said mechanisms to said series of members, and means to effect simultaneously the operation of said perforating device and said last mentioned means and to initiate the operation of said counting device.

11. In a keyboard device, a plurality of keys, a counting device comprising a single unit wheel which constantly tends to rotate, a series of members adapted to control the extent of actuation of said unit wheel, a corresponding series of transfer levers, a selector mechanism comprising a corresponding series of selector levers each adapted to have an abutting relationship with its companion transfer lever, means to establish a condition in said mechanism to correspond to the key operated, and electromagnetic means adapted to effectuate through the abutting relationship of said levers the transference of said condition to said members.

12. In combination with a keyboard perforator suitable for the production of perforated tape representing lines of composition, a plurality of keys, a counting device comprising a single unit wheel which constantly tends to rotate, a series of members adapted to control the extent of actuation of said counting device, a scale, a pointer movable variably with respect to said scale to indicate the cumulative widths of characters, mechanical interconnection between said pointer and said unit wheel, a selector mechanism, means to establish a condition in said selector mechanism to correspond to the key operated, means to store the selective condition set up in said selector mechanism, means to impress said selective condition on said members, and means to effect simultaneously the operation of said last mentioned means and the initiation of operation of said counting device to control correspondingly the movement of said pointer.

13. In a keyboard perforator, a series of keys, a counting device comprising a single unit wheel constantly tending to rotate, a floating lever, a detent member for said unit wheel, a measuring member, a series of extent members, a transfer device, a selector mechanism operatively associated with said keys and adapted through the instrumentality of said transfer device to control said extent members according to the key operated, means to control said floating lever to effect in order the interaction of said measuring member and said unit wheel and the disengagement of said detent member whereby said unit wheel is rotated an amount predetermined by the relation between said measuring member and a selected one of said extent members, means to constrain said floating lever, and means to effect simultaneously the reengagement of said detent member and the liberation of said constraint to permit the disengagement of said measuring member.

14. In a keyboard device, a counting device comprising a series of members adapted to control the extent of actuation thereof, a selector mechanism, a series of keys, means to establish a condition in said selector mechanism to correspond to the key operated, means to transfer said condition to said members, and means controlled by said last mentioned means to insure the completion of said transference.

15. In a keyboard perforator, a series of keys, a single shaft, a counting device including a single unit wheel secured to said shaft, motive means carried on said shaft, frictional connection between said means and said shaft whereby said means tends to impart a constant torque to said shaft, a first escapement means to control the operation of said shaft, a series of extent members, a second escapement means cooperative with said members to control the extent of actuation of said unit wheel, a selector mechanism, means to establish a condition in said selector mechanism to correspond to the key operated, abutting means to impress said condition on said extent members, and means to effect simultaneously the operation of said last mentioned means and the initiation of operation of said counting device.

16. In a keyboard device, a series of keys, a counting device comprising a series of members adapted to control the extent of actuation thereof, a shiftable code mechanism, a pair of special keys operable alternatively to establish either of two different conditions in said code mechanism, a selector mechanism, means to establish a condition in said selector mechanism through the instrumentality of said code mechanism to correspond to one of the series of keys operated, and abutting means to impress said condition on said series of members.

17. In a keyboard device, a series of keys, a counting device comprising a series of members adapted to control the extent of actuation thereof, a series of code bars, operative connection between the keys and the code bars such that the code bars may be operated in a plurality of ways for each key, means to select the way in which a code bar is to be operated, a selector mechanism, means to establish a condition in said selector mechanism to correspond to the code bar operated, and abutting means to impress said condition on said series of members.

18. In a keyboard device, a plurality of keys, a counting device comprising a single unit wheel which constantly tends to rotate, a series of members adapted to control the extent of actuation of said unit wheel, a corresponding series of transfer levers, a selector mechanism, means to establish a condition in said mechanism to correspond to the key operated, means adapted to effectuate through said levers the transference of said condition to said members, and means controlled by said last mentioned means to insure the completion of said transference.

19. In a keyboard device, a plurality of keys, a counting device comprising a single unit wheel which constantly tends to rotate, a series of stop bars, a transfer device comprising a plurality of sets of abutting members, a selector mechanism operatively associated with said stop bars through said transfer device, and means to effect the transference of the setting of the selector mechanism while a succeeding setting may be set up in the selector mechanism.

20. In a keyboard apparatus, a counting device, a plurality of elements, a selector mechanism, a series of keylevers, a code member individual to each keylever, each of said code members adapted to be actuated by its corresponding keylever to operate selectively said selector mechanism, and transfer means comprising a duality of sets of abutting members, one of said sets adapted to store the selective condition set up in the selector mechanism and the other of said sets adapted to receive the selective condition from said one of said sets to control thereafter the extent of operation of said counting device.

21. In a keyboard perforator, a perforating device, a counting device, a plurality of selector mechanisms arranged in the same plane, a series of extent members, a series of keys, means to establish independent conditions in said selector mechanism to correspond to the key operated, means to store the selective condition set up in one of said selector mechanisms, means to receive the selective condition from said storing means to control thereafter the extent of operation of said counting device, said perforating device adapted to be operable in accordance with the condition established in the other of said selector mechanisms, and means to effect simultaneously the operation of said perforating device and said last mentioned means and to initiate the operation of said counting device.

22. In a keyboard device, a counting mechanism, a selector mechanism, a series of keylevers, a corresponding series of code elements juxtapositioned to said keylevers and arranged transversely of said selector mechanism, a transfer mechanism, and a series of elements controlled by said keylevers through the instrumentality of said code elements and said transfer mechanism to control the operation of said counting mechanism.

23. An apparatus for preparing a record to be used to control linecasting and composing machines utilizing matrices of different thicknesses, comprising character selecting elements corresponding to the different matrices, means for indicating during the process of recording the length of a line of matrices to be set up under control of the record, selector mechanisms, a series of code members, each of said code members adapted to be actuated by its corresponding character selecting element to selectively operate the selector mechanisms, and transfer means comprising a duality of sets of abutting members, one of said sets adapted to store the selective condition set up in the selector mechanism, and the other of said sets adapted to receive the selective condition from said one of said sets to control thereafter the extent of operation of said counting device.

ALBERT H. REIBER.
MAURUS T. GOETZ.